(12) United States Patent  (10) Patent No.: US 8,373,944 B2
Biskeborn  (45) Date of Patent: Feb. 12, 2013

(54) LOW FRICTION TAPE HEAD AND SYSTEM IMPLEMENTING SAME

(75) Inventor: Robert G. Biskeborn, Hollister, CA (US)

(73) Assignee: International Business Machines Corporation, Armonk, NY (US)

( * ) Notice: Subject to any disclaimer, the term of this patent is extended or adjusted under 35 U.S.C. 154(b) by 55 days.

(21) Appl. No.: 13/117,013

(22) Filed: May 26, 2011

(65) Prior Publication Data

US 2012/0300338 A1  Nov. 29, 2012

(51) Int. Cl.
*G11B 5/265* (2006.01)
(52) U.S. Cl. ....................................... 360/110
(58) Field of Classification Search ............ 360/110
See application file for complete search history.

(56) References Cited

U.S. PATENT DOCUMENTS

| | | | |
|---|---|---|---|
| 4,423,450 A | 12/1983 | Hamilton |
| 4,439,793 A | 3/1984 | Nater |
| 4,956,737 A | 9/1990 | Brock |
| 5,289,328 A | 2/1994 | Saliba |
| 5,452,165 A | 9/1995 | Chen et al. |
| 5,475,553 A | 12/1995 | Saliba |
| 5,862,014 A | 1/1999 | Nute |
| 5,883,770 A | 3/1999 | Biskeborn et al. |
| 6,038,108 A | 3/2000 | Dee et al. |
| 6,118,626 A | 9/2000 | Muftu et al. |
| 6,122,147 A | 9/2000 | Fahimi et al. |
| 6,301,051 B1 | 10/2001 | Sankur |
| 6,350,178 B2 | 2/2002 | Weiss et al. |
| 6,433,959 B1 | 8/2002 | Lakshmikumaran et al. |
| 6,534,221 B2 | 3/2003 | Lee et al. |
| 6,606,219 B2 | 8/2003 | Lam |
| 6,624,960 B1 | 9/2003 | Langiano et al. |
| 6,690,542 B1 | 2/2004 | Wang |
| 6,972,931 B2 | 12/2005 | Rudi et al. |
| 7,008,737 B2 | 3/2006 | Morales et al. |
| 7,209,324 B2 | 4/2007 | Brock et al. |
| 7,239,465 B1 | 7/2007 | Watson et al. |
| 7,271,983 B2 | 9/2007 | Saliba |
| 7,359,156 B2 | 4/2008 | Biskeborn |

(Continued)

FOREIGN PATENT DOCUMENTS

DE  3318902 A1  11/1984
WO  03/105133 A1  12/2003

OTHER PUBLICATIONS

Final Office Action Summary from U.S. Appl. No. 12/047,116 dated Dec. 21, 2011.

(Continued)

*Primary Examiner* — Mark Blouin
(74) *Attorney, Agent, or Firm* — Zilka-Kotab, PC

(57) ABSTRACT

A magnetic head according to one embodiment includes outer modules each having a tape bearing surface and an array of transducers selected from a group consisting of readers and writers; and an inner module positioned between the outer modules, the inner module having a tape bearing surface and an array of transducers selected from a group consisting of readers and writers, wherein portions of edges of the tape bearing surface of the inner module are non-skiving in regions not aligned with the array of transducers in a direction of media travel thereacross, wherein an outer edge of the tape bearing surface of each of the outer modules are adapted for skiving air from the magnetic medium when the magnetic medium travels in a direction from the respective outer module towards the inner module.

19 Claims, 10 Drawing Sheets

U.S. PATENT DOCUMENTS

| | | |
|---|---|---|
| 7,414,811 B2 | 8/2008 | Biskeborn |
| 7,467,757 B2 | 12/2008 | Biskeborn et al. |
| 7,585,596 B1 | 9/2009 | Johnson et al. |
| 7,646,565 B2 | 1/2010 | Biskeborn et al. |
| 7,656,602 B2 * | 2/2010 | Iben et al. .................. 360/66 |
| 7,660,072 B2 | 2/2010 | Biskeborn et al. |
| 7,724,465 B2 * | 5/2010 | Koeppe ................ 360/77.01 |
| 7,751,154 B2 * | 7/2010 | Wu .............................. 360/313 |
| 2002/0018964 A1 | 2/2002 | Jerominek |
| 2003/0076631 A1 | 4/2003 | Torline et al. |
| 2003/0154908 A1 | 8/2003 | Webber et al. |
| 2004/0228034 A1 | 11/2004 | Nakao et al. |
| 2005/0053844 A1 | 3/2005 | Wu |
| 2005/0207062 A1 | 9/2005 | Johnson |
| 2005/0284207 A1 | 12/2005 | Biskeborn et al. |
| 2006/0232884 A1 | 10/2006 | Biskeborn |
| 2007/0183091 A1 | 8/2007 | Saliba |
| 2008/0170328 A1 | 7/2008 | Kawakami et al. |
| 2008/0218903 A1 | 9/2008 | Biskeborn |
| 2009/0189302 A1 | 7/2009 | Fujita et al. |
| 2009/0231756 A1 | 9/2009 | Koeppe |
| 2009/0231757 A1 | 9/2009 | Biskeborn et al. |
| 2009/0268343 A1 | 10/2009 | Biskeborn et al. |
| 2010/0053810 A1 | 3/2010 | Biskeborn et al. |

OTHER PUBLICATIONS

U.S. Appl. No. 12/831,149 dated Jul. 6, 2010.

Dee, "Magnetic Tape Recording Technology and Devices," 1998 IEEE, 1998 Int'l NonVolatile Memory Technology Conference, pp. 55-64.

Non-Final Office Action Summary from U.S. Appl. No. 12/047,116 dated Mar. 28, 2012.

Non-Final Office Action Summary from U.S. Appl. No. 12/047,116 dated Aug. 14, 2012.

U.S. Appl. No. 13/009,758, filed Jan. 19, 2011.

U.S. Appl. No. 12/047,116, filed Mar. 12, 2008.

Non-Final Office Action Summary from U.S. Appl. No. 12/047,116 dated Mar. 22, 2011.

Restriction/Election Requirement from U.S. Appl. No. 12/047,116 dated Feb. 15, 2011.

Non-Final Office Action Summary from U.S. Appl. No. 12/047,116 dated Sep. 6, 2011.

Restriction/Election Requirement from U.S. Appl. No. 12/831,149 dated Dec. 3, 2012.

Non-Final Office Action from U.S. Appl. No. 12/831,149 dated Dec. 12, 2012.

* cited by examiner

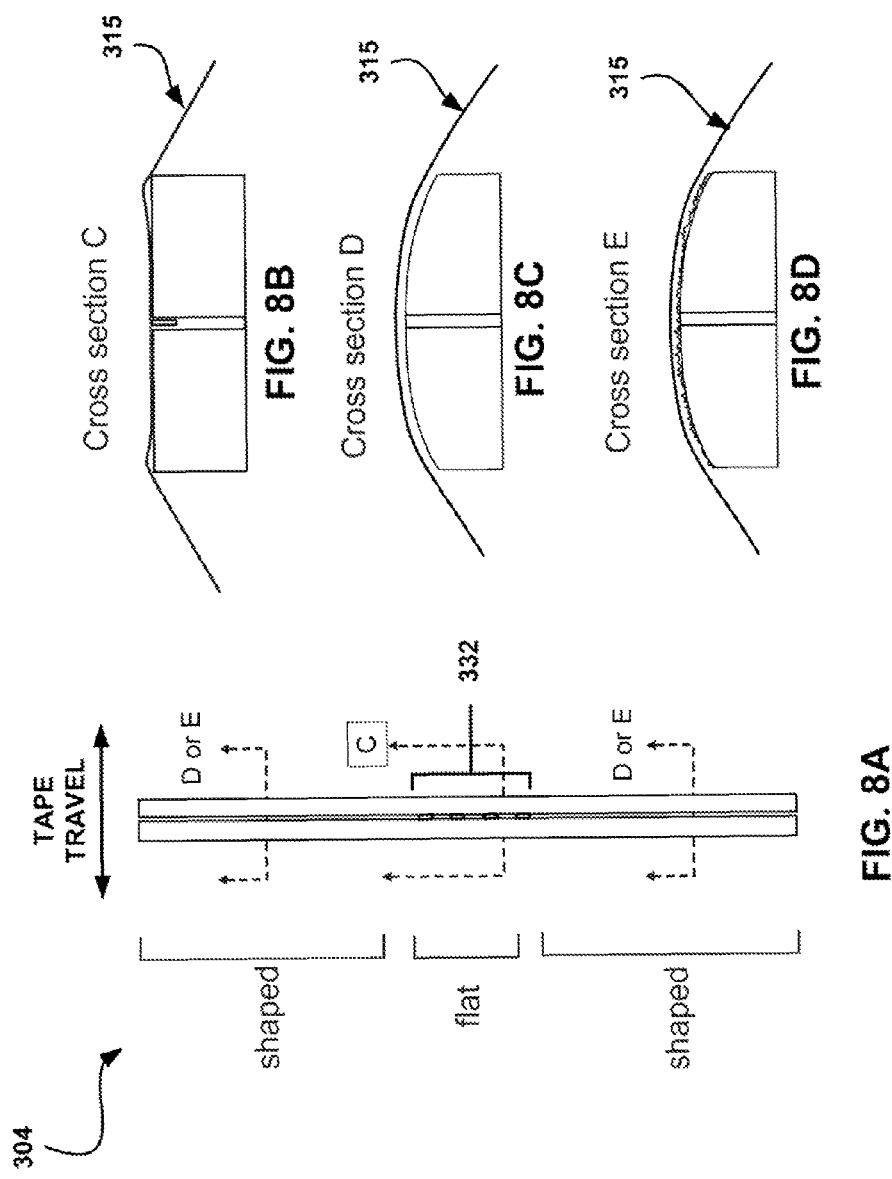

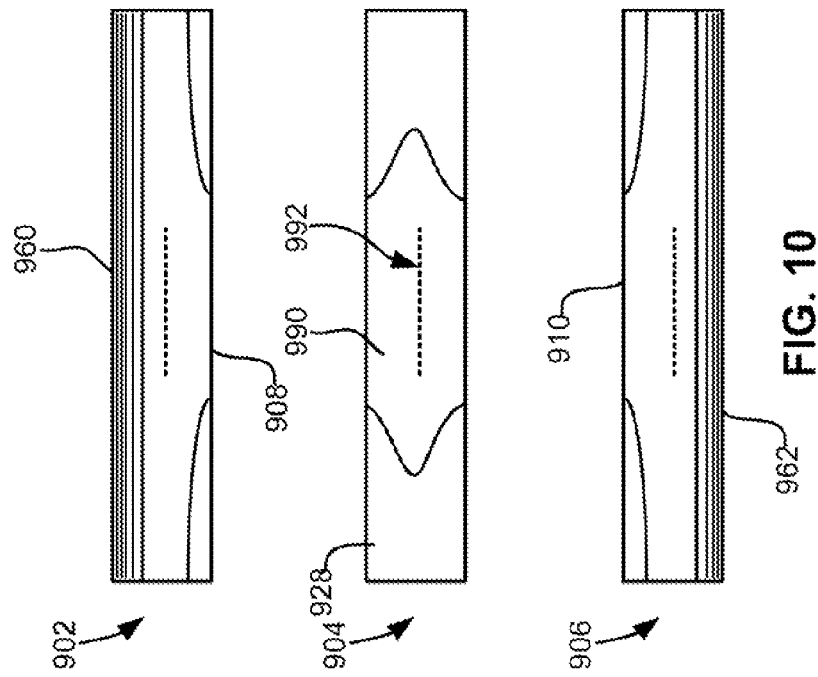
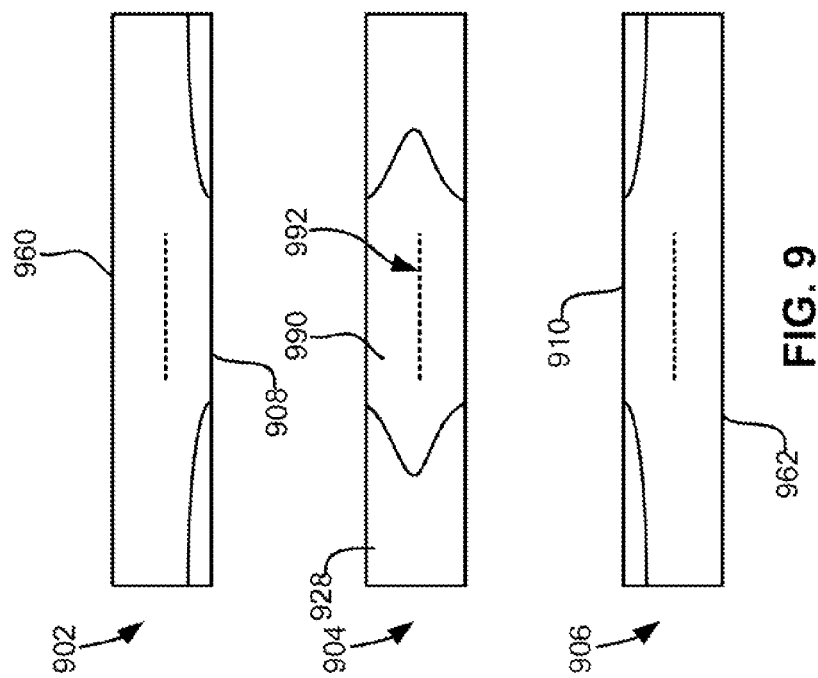

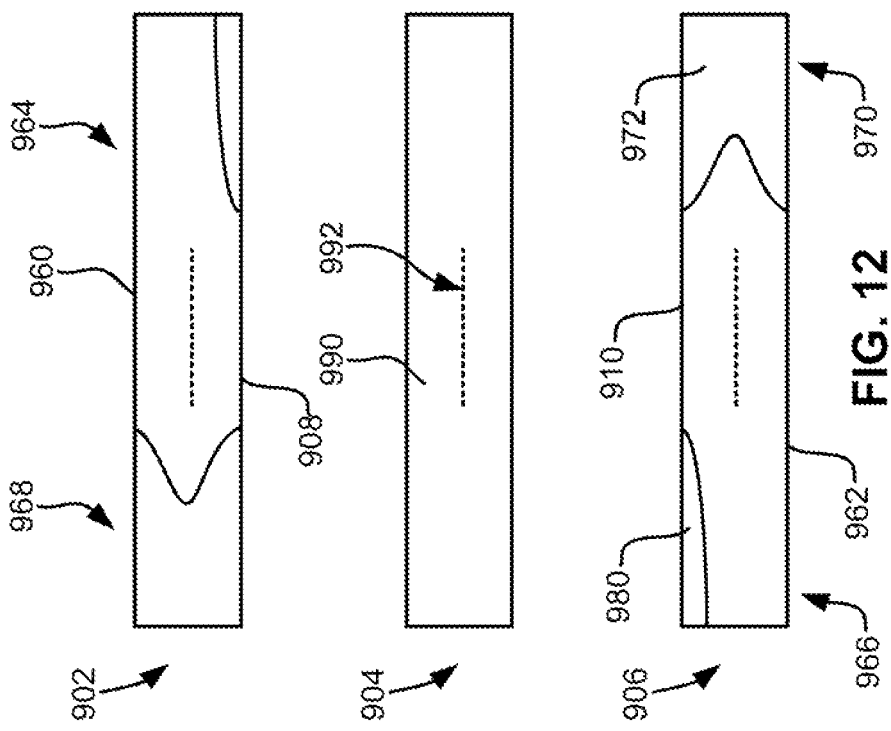
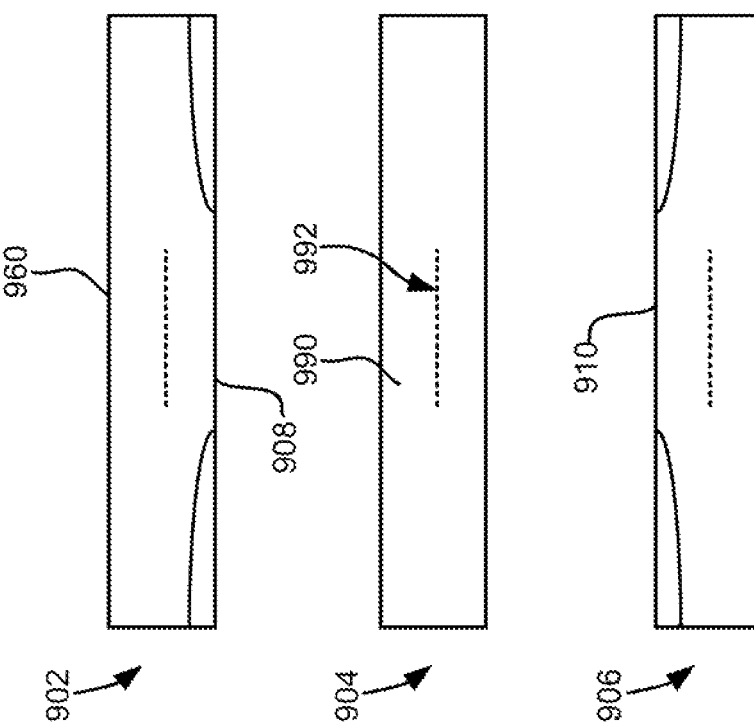

LOW FRICTION TAPE HEAD AND SYSTEM IMPLEMENTING SAME

BACKGROUND

The present invention relates to magnetic tape storage systems, and more particularly, this invention relates to a low friction tape head.

Business, science and entertainment applications depend upon computers to process and record data, often with large volumes of the data being stored or transferred to nonvolatile storage media, such as magnetic discs, magnetic tape cartridges, optical disk cartridges, floppy diskettes, or floptical diskettes. Typically, magnetic tape is the most economical and convenient means of storing or archiving the data. Storage technology is continually pushed to increase storage capacity and storage reliability. Improvement in data storage densities in magnetic storage media, for example, has resulted from improved medium materials, improved magnetic read/write heads, improved error correction techniques and decreased areal bit sizes. The data capacity of half-inch magnetic tape, for example, is now measured in tens of terabytes (thousands of gigabytes) on 2000 or more data tracks.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of higher performance tape drive systems has created various problems in the design and manufacture of a tape head assembly for use in such systems.

In a tape drive system, magnetic tape is moved over the surface of the tape head at high speed. Usually the tape head is designed to minimize the spacing between the head and the tape. The spacing between the magnetic head and the magnetic tape is crucial so that the recording gaps of the transducers, which are the source of the magnetic recording flux, are in near contact with the tape to effect efficient signal transfer, and so that the read element is in near contact with the tape to provide effective coupling of the magnetic field from the tape to the read element.

BRIEF SUMMARY

A magnetic head according to one embodiment includes outer modules each having a tape bearing surface and an array of transducers selected from a group consisting of readers and writers; and an inner module positioned between the outer modules, the inner module having a tape bearing surface and an array of transducers selected from a group consisting of readers and writers, wherein portions of edges of the tape bearing surface of the inner module are non-skiving in regions not aligned with the array of transducers in a direction of media travel thereacross, wherein an outer edge of the tape bearing surface of each of the outer modules are adapted for skiving air from the magnetic medium when the magnetic medium travels in a direction from the respective outer module towards the inner module.

A magnetic head according to another embodiment includes outer modules each having a tape bearing surface and an array of transducers selected from a group consisting of readers and writers; and an inner module positioned between the outer modules, the inner module having a tape bearing surface and an array of transducers selected from a group consisting of readers and writers, wherein portions of the tape bearing surface of the inner module positioned laterally to the array of transducers are rough, wherein an outer edge of the tape bearing surface of each of the outer modules are adapted for skiving air from the magnetic medium when the magnetic medium travels in a direction from the respective outer module towards the inner module.

A magnetic head according to yet another embodiment includes outer modules each having a tape bearing surface and an array of transducers selected from a group consisting of readers and writers; and an inner module positioned between the outer modules, the inner module having a tape bearing surface and an array of transducers selected from a group consisting of readers and writers, wherein portions of inner edges of the tape bearing surface of the each of the outer modules are non-skiving in regions not aligned with the array of transducers in a direction of media travel thereacross, the inner edges facing the inner module.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 8A shows simplified representation of a multi-module magnetic head, in accordance with one embodiment.

FIGS. 8B-8D show cross sections of the inner module of FIG. 8A, in accordance with one embodiment.

FIG. 9 shows simplified representation of a multi-module magnetic head, in accordance with one embodiment.

FIG. 10 shows simplified representation of a multi-module magnetic head, in accordance with one embodiment.

FIG. 11 shows simplified representation of a multi-module magnetic head, in accordance with one embodiment.

FIG. 12 shows simplified representation of a multi-module magnetic head, in accordance with one embodiment.

DETAILED DESCRIPTION

Figure 1:
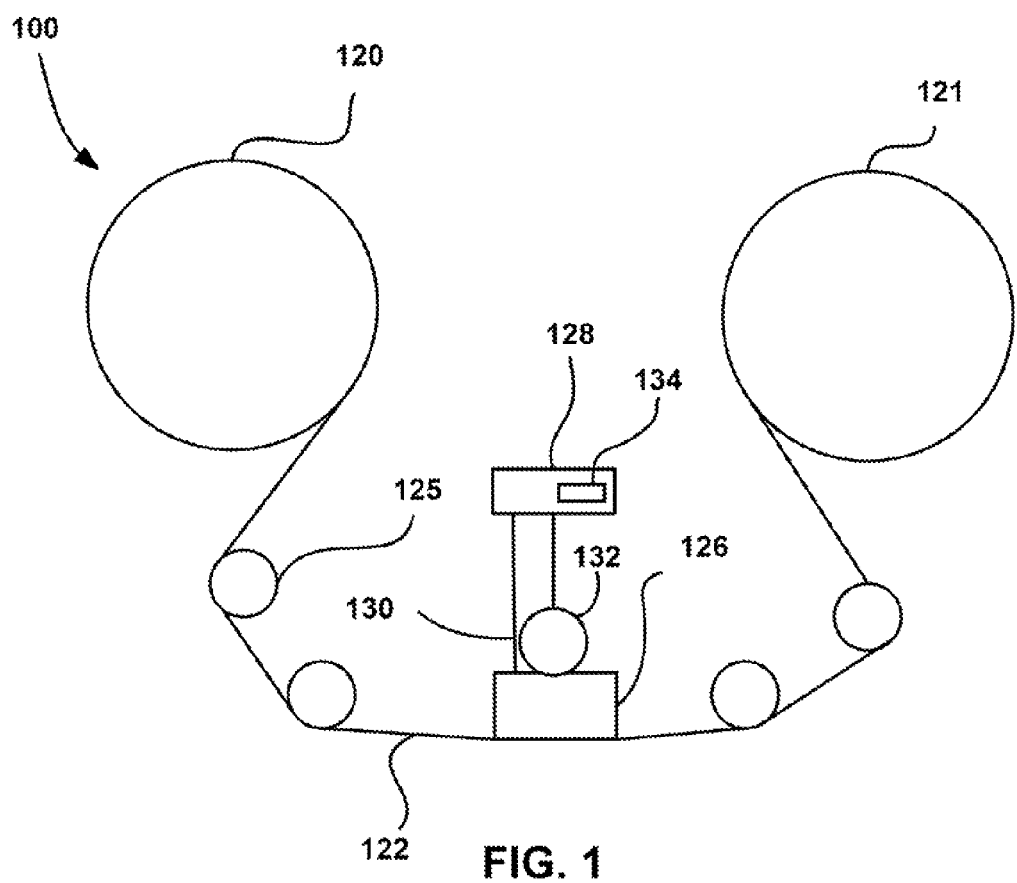
FIG. 1 is a schematic diagram of a simplified tape drive system according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of a multi-module heads and system implementing the same.

In one general embodiment, a magnetic head includes outer modules each having a tape bearing surface and an array of transducers selected from a group consisting of readers and writers; and an inner module positioned between the outer modules, the inner module having a tape bearing surface and an array of transducers selected from a group consisting of readers and writers, wherein portions of edges of the tape bearing surface of the inner module are non-skiving in regions not aligned with the array of transducers in a direction of media travel thereacross, wherein an outer edge of the tape bearing surface of each of the outer modules are adapted for skiving air from the magnetic medium when the magnetic medium travels in a direction from the respective outer module towards the inner module.

In another general embodiment, a magnetic head includes outer modules each having a tape bearing surface and an array of transducers selected from a group consisting of readers and writers; and an inner module positioned between the outer modules, the inner module having a tape bearing surface and an array of transducers selected from a group consisting of readers and writers, wherein portions of the tape bearing surface of the inner module positioned laterally to the array of transducers are rough, wherein an outer edge of the tape bearing surface of each of the outer modules are adapted for skiving air from the magnetic medium when the magnetic medium travels in a direction from the respective outer module towards the inner module.

In yet another general embodiment, a magnetic head includes outer modules each having a tape bearing surface and an array of transducers selected from a group consisting of readers and writers; and an inner module positioned between the outer modules, the inner module having a tape bearing surface and an array of transducers selected from a group consisting of readers and writers, wherein portions of inner edges of the tape bearing surface of the each of the outer modules are non-skiving in regions not aligned with the array of transducers in a direction of media travel thereacross, the inner edges facing the inner module.

FIG. 1 illustrates a simplified tape drive 100 of a tape-based data storage system, which may be employed in the context of the present invention. While one specific implementation of a tape drive is shown in FIG. 1, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller assembly 128 via a cable 130. The controller 128 typically controls head functions such as servo following, writing, reading, etc. The controller may operate under logic known in the art, as well as any logic disclosed herein. The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive and a host (integral or external) to send and receive the data and for controlling the operation of the tape drive and communicating the status of the tape drive to the host, all as will be understood by those of skill in the art.

Figure 2:
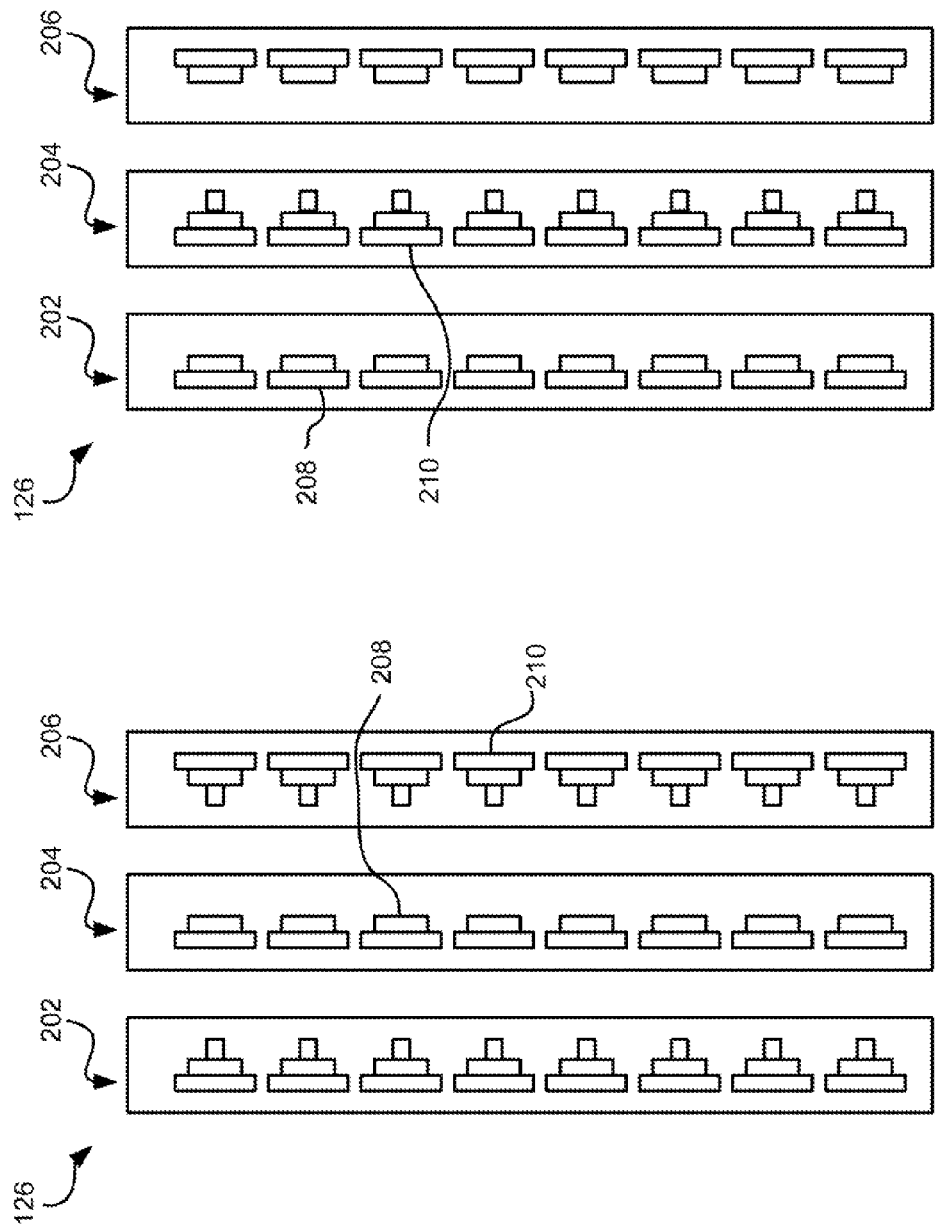
FIG. 2A is a partial tape bearing surface view of a magnetic head having a write-read-write configuration.
FIG. 2B is a partial tape bearing surface view of a magnetic head having a read-write-read configuration.

The configuration of the tape head 126 according to one embodiment includes multiple modules, preferably three or more. In a write-read-write (W-R-W) head, outer writing modules flank a single reading module. As the names imply, the outer modules 202, 206 each include one or more arrays of writers 208 in a configuration, for example, as shown in FIG. 2A. The reading module 204 includes one or more arrays of readers 210 in a similar configuration. Variations of a multi-module head include a R-W-R head (FIG. 2B), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 3:
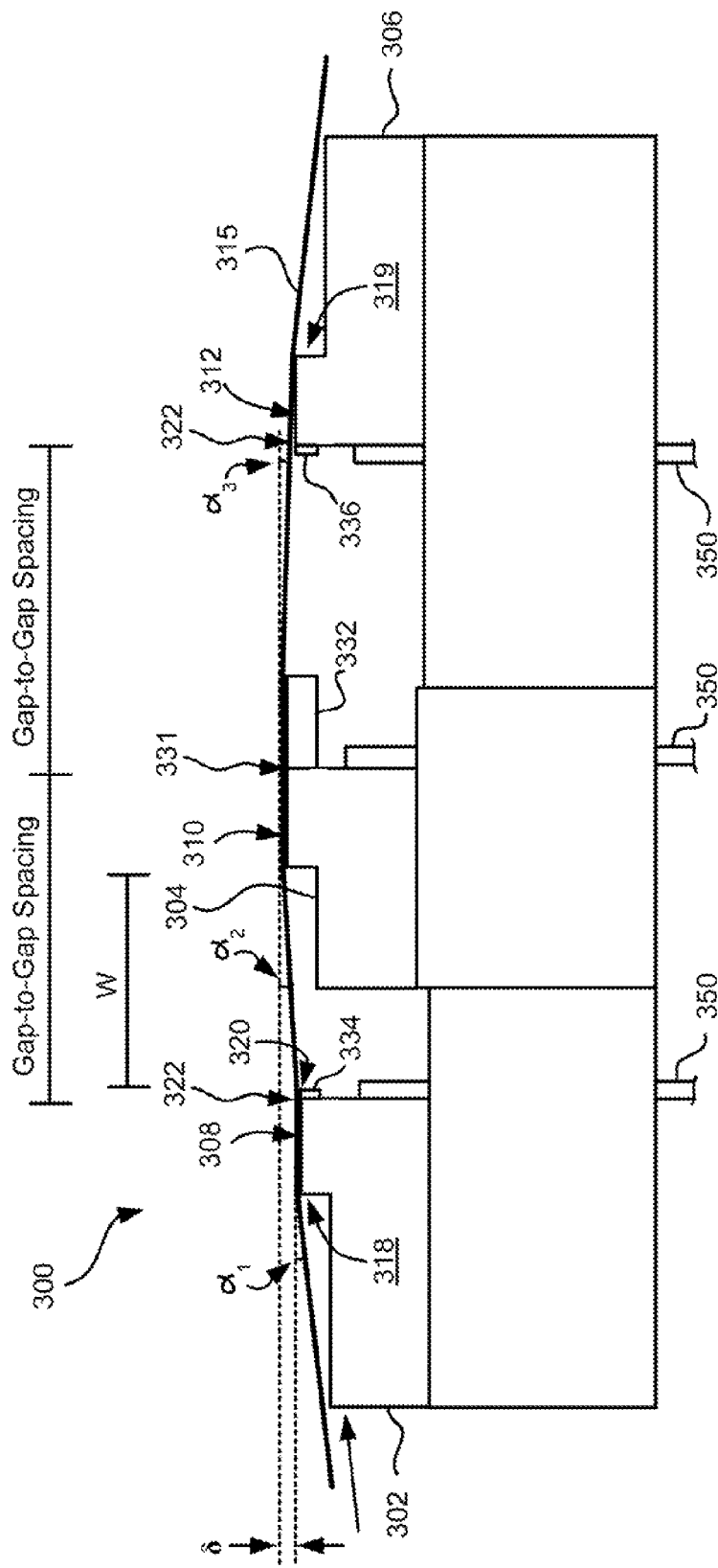
FIG. 3 is a side view of a magnetic tape head with three modules according to one embodiment where the modules all generally lie along parallel planes.

FIG. 3 illustrates a magnetic head 300 according to one embodiment of the present invention that includes first, second and third modules 302, 304, 306 each having a flat profile tape bearing surface 308, 310, 312 respectively. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or flying) above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

In one embodiment, the tape bearing surfaces 308, 310, 312 of the first, second and third modules 302, 304, 306 lie on either parallel or nearly parallel planes, and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.5° to about 1.1°, though can be any angle required by the design.

Beneficially, the inner wrap angle $\alpha_2$ may be slightly greater on the side of the module 304 receiving the tape (leading edge) than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 in FIG. 3 are displaced relative to the tape bearing surface 310 of the second module 304 to create a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. The negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306. This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of standard writers 322 and no readers, with the exception that the outer modules 302, 306 may include optional servo readers. The servo readers may be used to position the head during reading and/or writing operations. The servo reader(s) on each module are typically located towards the end of the array of readers or writers.

By having only readers or writers and servo readers in the gap between the substrate and closure, the gap length can be substantially reduced. Typical heads have piggybacked readers and writers, where the writer is formed above each reader. A typical gap is 25-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 3, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures such as shown in the second module 304, an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than standard LTO tape head spacing. The open space between the modules 302, 304, 306 can still be set to approximately 0.5 to 0.6 mm, which in some embodiments is ideal for stabilizing tape motion over the second module 304.

Figure 4:
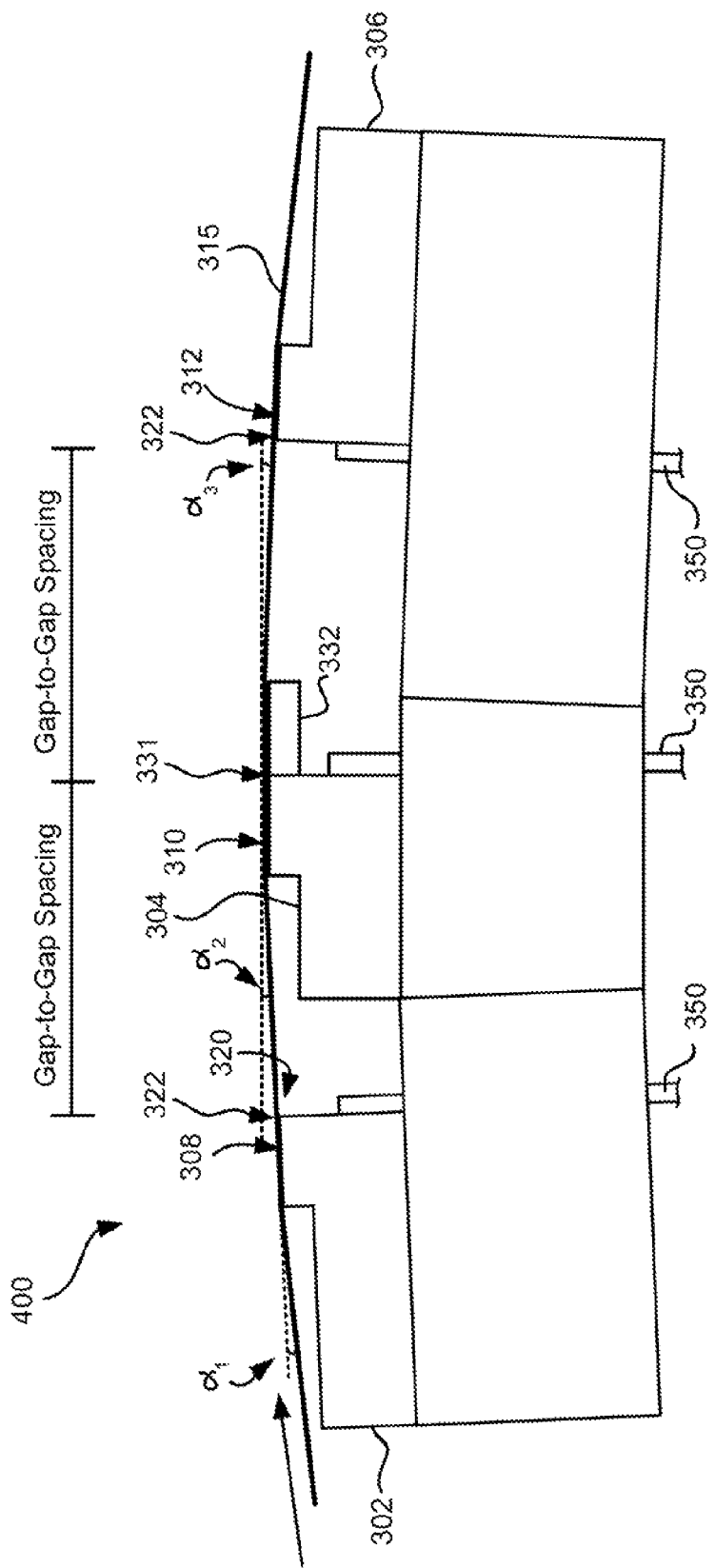
FIG. 4 is a side view of a magnetic tape head with three modules in a tangent (angled) configuration.

Depending on tape tension and stiffness, it may be desirable to angle the tape bearing surfaces of the outer modules relative to the tape bearing surface of the second module. FIG. 4 illustrates an embodiment 400 where the modules 302, 304, 306 are in a tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The inventor has found that the tape will also pop off of the trailing module 306 in this embodiment, thereby reducing wear on the elements in the trailing module 306. These embodiments are particularly adapted for write-read-write applications. Additional aspects of these embodiments are similar to those given above.

Typically, the tape wrap angles may be set about midway between the embodiments shown in FIGS. 3 and 4.

A further benefit for reducing friction enabled by this embodiment is the ability to reduce the length of the inner module tape bearing surface in the direction of tape movement thereacross. This is possible, because the outer modules "stabilize" the wrap on both sides of the inner module, i.e., both sides are internal and not subject to flutter associated with external wraps. In general, the length of the inner module tape bearing surface in the direction of tape movement thereacross may be about 500 microns or less, e.g., between about 100 and about 500 microns; and in some approaches about 400 microns or less, e.g., between about 200 and about 400 microns.

Figure 5:
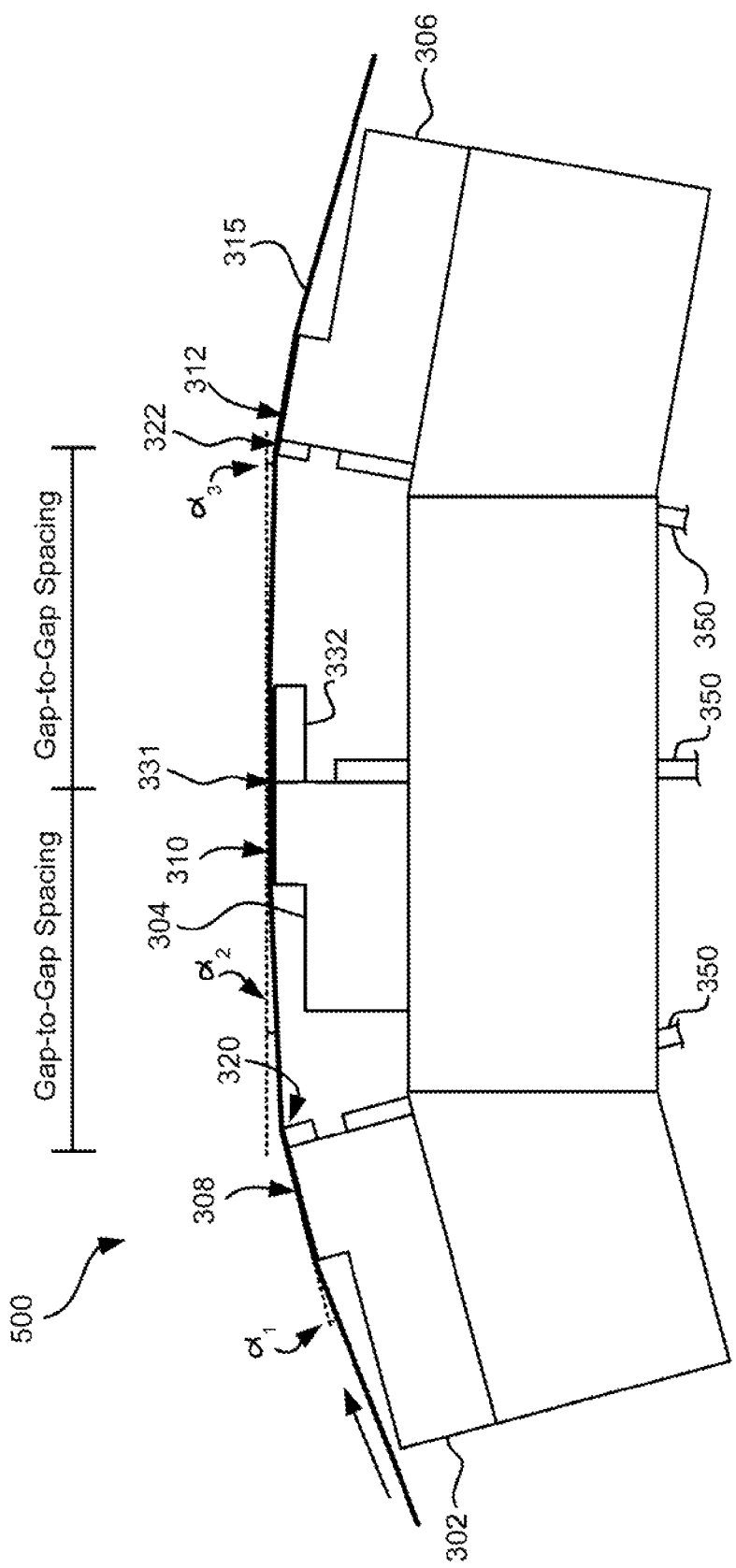
FIG. 5 is a side view of a magnetic tape head with three modules in an overwrap configuration.

FIG. 5 illustrates an embodiment 500 where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures will force a wider gap-to-gap separation. Therefore the preferred embodiment has a write-read-write configuration, which may use shortened closures that thus allow closer gap-to-gap separation.

Additional aspects of the embodiments shown in FIGS. 4 and 5 are similar to those given above.

To assemble any of the embodiments described above, conventional u-beam assembly can be used. Accordingly, the mass of the resultant head can be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads.

A 32 channel version of this head may use cables 350 (referring back to FIG. 3) having leads on the same pitch as current 16 channel piggyback LTO modules, or alternatively the connections on the module may be organ-keyboarded for a reduction in cable span.

The outer wrap angles $\alpha_1$ may be set in the drive, such as by guides 602, 604 of any type known in the art, such as adjustable rollers, slides, etc. For example, rollers having an offset axis may be used to set the wrap angles. The offset axis creates an orbital arc of rotation, allowing precise alignment of the wrap angle $\alpha_1$.

The outer wrap angles $\alpha_1$ and tolerances are typically on the order of about 0.5 to about 2 degrees, e.g., 1 degree with +/−0.1 degree tolerance. To establish this type of precision, the signals such as servo signals coming from the head while tape is moving across it, may be used to detect and monitor the tape to head wrap established during the drive manufacturing procedures.

In some approaches, the position of the guides may be set during manufacture and fixed, while in others the guides may be adjusted in the field, while in yet others, the guides may be set during manufacture and can be later adjusted in the field. Any known mechanism to set and fix the guides, or make them adjustable may be used.

For drive integration a two position skew plate may be provided to accommodate for small differences in writer-to-reader module alignment for left and right hand writers. Alternatively, differences in alignment may be compensated by a skew actuator.

Any of the above embodiments or combinations of portions thereof can also be applied to any type of magnetic heads and magnetic recording systems, both known and yet to be invented. For example, the teachings herein are easily adaptable to interleaved heads, which typically include opposing modules each having an array of alternating readers and writers configured to provide read-while-write capability.

In the quest to develop tape media, and particularly tape media having a thinner magnetic coating, the tape media has become smoother. However, smoother tape media has resulted in higher levels of static and running friction on the head. To exemplify, consider that in a tape drive system, a magnetic tape is moved over the surface of the tape head. If the tape is rough, this movement generally entrains a film of air between the head and tape. However, smoother tape media does not entrain as much air, resulting in more intimate contact between head and tape thereby increasing running friction.

Static friction, also known as "stiction" and "startup friction" at the head-tape interface of a tape drive can also be a significant issue. The stiction forces for smooth tapes can be so high that a drive cannot cause the tape medium to come free from the head. If excessive force is used to move the tape, the tape may become damaged or even break.

It is generally accepted that passing a tape over a skiving edge results in higher running friction than running a tape over a beveled edge. During development of a three module head similar to those describe above, possible solutions to the friction/stiction problem were contemplated.

One solution that was contemplated for the friction problem of a three module head was beveling portions of the edges of the tape bearing surfaces of all three modules. This was expected to reduce friction by increasing the amount of air entrained by the tape, as well as by not requiring the tape to wrap a skiving edge extending along the length of the tape bearing surface edges. However, this solution has a drawback, namely that debris tends to accumulate on the beveled portions. This is observed on all beveled modules.

Making the outer edges of the outer modules skiving was contemplated as a solution to the debris problem, but was expected to increase running friction. Surprisingly and unexpectedly, the inventor found in experiments that by using outer modules with outer skiving edges, and an inner module with beveled portions, debris accumulation on beveled portions of the inner module was less than observed on other heads such as two module heads, and further that average running friction was generally less than that for both three module heads having all skiving edges and three module heads having all partially beveled edges.

Thus, embodiments of the present invention address the conflicting desires for debris removal and friction control in a magnetic head for flexible media such as tape.

A three module head according to one embodiment of the present invention, e.g., generally having a configuration as shown in FIG. 3, and described with reference thereto, includes outer modules 302, 306 each having a tape bearing surface and an array of transducers 322 selected from a group consisting of readers and writers. An inner module 304 is positioned between the outer modules, the inner module having a tape bearing surface and an array of transducers 331 selected from a group consisting of readers and writers. Portions of edges of the tape bearing surface of the inner module are non-skiving in regions not aligned with the array of transducers in a direction of tape travel thereacross.

Figure 6:
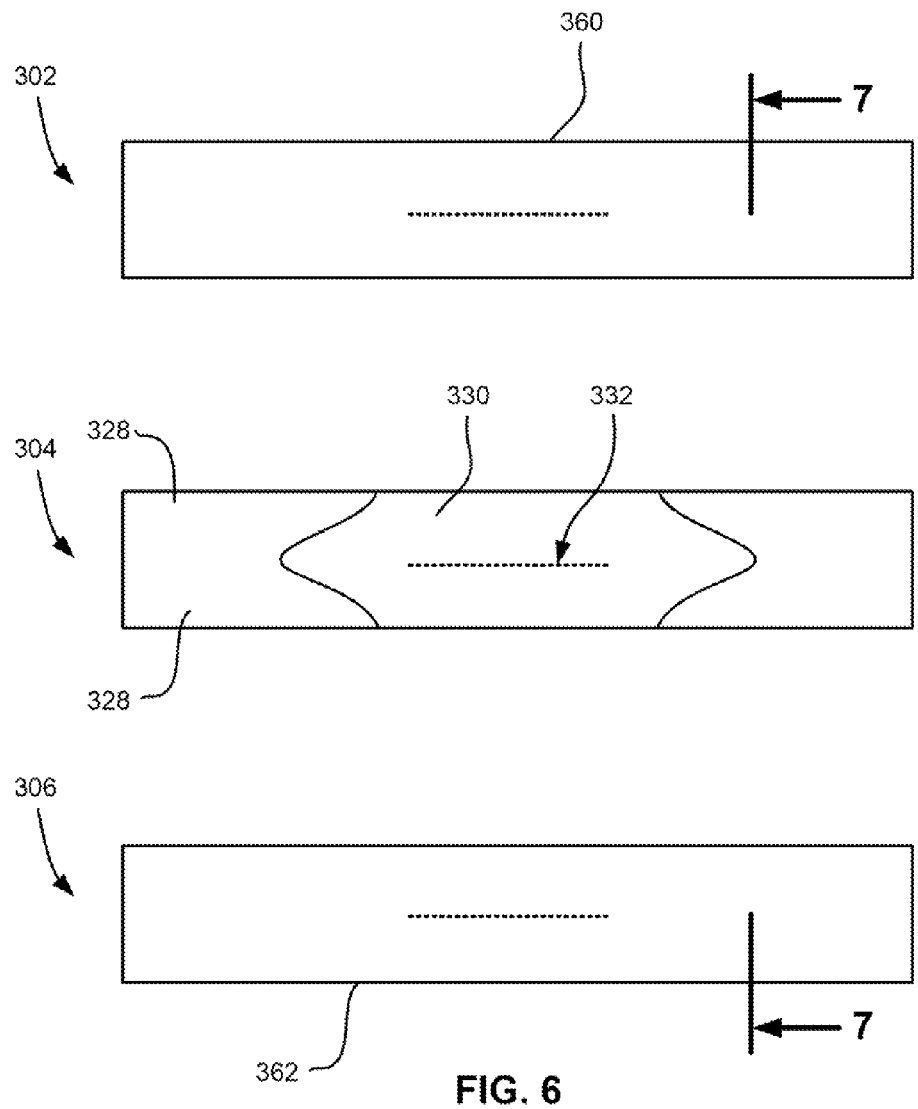
FIG. 6 is a tape bearing surface view of a portion of a tape head having a patterned inner module according to one embodiment.
Figure 7:
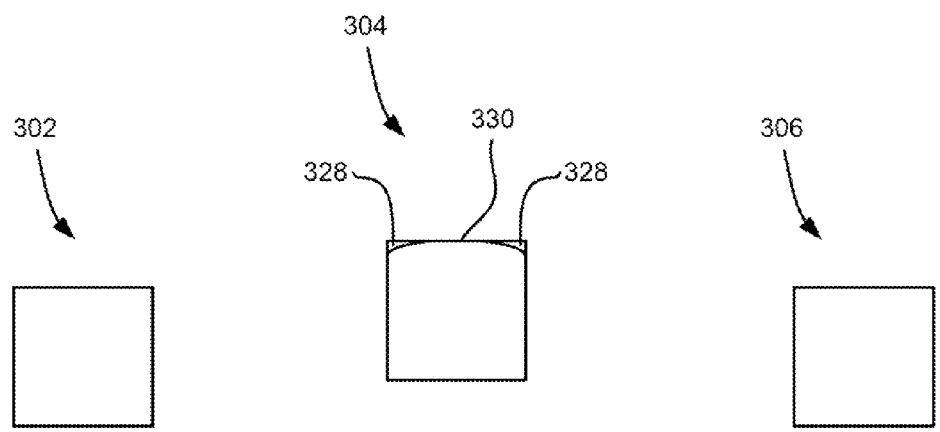
FIG. 7 is a cross sectional view taken from Line 7-7 of FIG. 6.

In one embodiment, the inner module has patterning for inducing the magnetic medium to fly thereover in an area away from the transducers and/or to reduce stiction of the medium to the tape bearing surface of the portion (as compared to a smooth, planar tape bearing surface). Examples of patterning include one or more of texturing and beveling of sections of the tape bearing surface edge. FIGS. 6 and 7 illustrate an example of an inner module 304 having patterning such as can be achieved by tape lapping. In a tape lapping process, a tape having abrasive sections, e.g., of diamond, alumina, etc. is drawn over the portion to selectively abrade areas thereof. In this example, the abrasive tape may have abrasive strips flanking a central nonabrasive strip. As shown in the example of FIGS. 6 and 7, areas 328 of edges of the tape bearing surface 330 of the inner module 304 not aligned with the transducers 332 become beveled. The beveling promotes entrainment of air between the medium and the tape bearing surface. The sections of the edges of the tape bearing surface aligned with the transducers are not significantly affected by the tape lapping, and therefore retain their ability to skive air from the tape. In one illustrative embodiment, the inner module and outer modules have patterning with physical characteristics of being lapped by tape lapping. As further shown in FIGS. 6 and 7, the outer modules 302, 304 have skiving edges extending along the outer edge 360, 362 of their respective tape bearing surfaces.

Referring again to FIG. 3, the outer edge 318, 319 of the tape bearing surface of each of the outer modules 302, 306 are adapted for skiving air from the magnetic medium 315 when the magnetic medium travels in a direction from the respective outer module towards the inner module. Generally, the outer edge of the tape bearing surface of each of the outer modules is the farthest edge from the inner module.

In an exemplary embodiment, a magnetic head is comprised of three modules, in a configuration generally as described herein. In a preferred embodiment, the modules are arranged in a write-read-write configuration. For example, the array of transducers of the inner module may include a plurality of readers, at least one servo reader calibrated to the position of one or more of the readers of the inner module, and no writers while the array of transducers of each of the outer module includes a plurality of writers and no readers except servo readers. In such illustrative design, the edges of the inner module that provides the reading function are beveled, but the outer edges of the outer modules providing the writing function are not beveled. Preferably, an entire length of a tape engaging portion of the outer edge (e.g., the portion of the outer edge that is in closest proximity to the tape when the drive is in use) of each of the tape bearing surfaces of the outer modules is adapted for skiving. Thus, in one approach, the writing modules, which may be arranged to minimize both static and dynamic friction, are effective at cleaning 100% of the tape width, independently for each direction of tape motion. This minimizes debris collecting on the beveled portion of the reader module, as could occur if the writer modules were beveled. The head may be designed so the tape does not adhere to the writer modules when stopped, due to the tape being statically underwrapped. Furthermore, the wrap construction enables reducing the width of the skiving (non-beveled) portion of the reader module compared to a conventional head. This in turn enables lower wrap angles. Lower wrap and reduced contact area further help reduce friction.

FIG. 8A shows an inner module 304, in accordance with one embodiment. As shown, the inner module 304 has a tape bearing surface and an array of transducers 332, the transducers being selected from a group consisting of readers, writers and servo readers. Furthermore, a length of the array 332 is defined between outer ends of the outer transducers thereof, and may include servo readers. Thus, as an option, the outer transducers may be the servo readers. In other various embodiments, the outer transducers may be any transducer used during a given reading or writing operation. In this case, the outer transducers may not necessarily be the outermost transducers present on the inner module 304.

In operation, a feature of the inner module 304 induces a formation of a larger spacing between a tape 315 and portions of the tape bearing surface positioned laterally to the array in a direction about perpendicular to a direction of tape travel thereacross than between the tape 315 and a contiguous portion of the tape bearing surface spanning across multiple transducers in the array, as shown in FIGS. 8B-8D. For example, the region with the closer spacing may extend across two or more of the transducers in the array. In another approach, the region with the closer spacing may extend at least half way along the length of the array 332 in front of or behind the array 332 relative to the direction of tape travel thereacross. In one embodiment, the larger spacing may be formed by an air bearing between the tape 315 and the portions of the tape bearing surface positioned laterally to the array 332. Furthermore, the inner module 304 may be configured such that no air bearing is formed over a majority of the array 332 (e.g. see FIG. 8B).

As an option, an edge of the tape bearing surface may extend about perpendicular to a direction of tape travel thereacross, the edge having a continuous skiving edge in front of the array 332 but not in areas away from the array, as shown in FIGS. 8B-8D. In one approach, the skiving edge has a continuous, uninterrupted length that is at least as long as a plurality of the transducers in the array as measured between outer ends of the transducers. In one embodiment, the skiving edge may have a length that is greater than about 50% of the array length. Additionally, the skiving edge may promote a contiguous area of contact between the tape 315 and the array 332 along a majority of a length of the array 332 (e.g. see FIG. 8B). As an option, the contiguous portion may extend beyond the length of the array 332.

As an option, the tape bearing surface may be predominantly rounded. For example, 50% to 100% of the tape bearing surface may be rounded, as shown in FIG. 8C.

In one embodiment, the portions of the tape bearing surface positioned laterally to the array 332 may be rough, as shown in FIG. 8D. In the context of the present description, rough refers to any deviation from smooth. For example, in various embodiments, the portions of the tape bearing surface positioned laterally to the array may be textured, bumped, roughened in a traditional sense, ridged, laser etched, wavy, discontinuous, and/or any other periodic and/or random deviation from smooth.

In one embodiment, the peak height may be approximately 30-200 nm with respect to the average taken over a region of 10 μm×10 μm. In this case, the surface finish may be chosen to give a small real contact area, but smooth enough not to cause tape wear. Furthermore, the depth may be large enough not to be worn away mainly during start-stop contact, but small enough not to protrude through the air bearing.

In this way, only the portion where the tape 315 contacts the surface will generate measurable running friction. For example if the magnetic elements span a length of only about ¼ of the width of the tape 315, the running friction will be reduced by about a factor of four.

It should be noted that, in some cases, changing the overall shape of the module to form an air bearing may not strongly affect stiction, because when stopped, the compliant tape may conform to the head shape. Thus, roughening may be utilized for reducing head-tape friction. However, in some situations, such roughening may increase tape wear. Additionally, the topography may be filled by tape debris or worn away by the tape.

Combining shaping and roughening may alleviate both running friction and stiction. The roughened surface reduces the real contact in the air bearing region such that there is very little stiction force from this area, even when the tape is starting from zero velocity. Further, because the tape lifts off this region as soon as the tape speed is appreciable, very little sliding contact occurs.

FIG. 9 depicts a magnetic head according to another embodiment. As shown, the head includes outer modules 902, 906 each having a tape bearing surface and an array of transducers selected from a group consisting of readers and writers. An inner module 904 is positioned between the outer modules, the inner module having a tape bearing surface and an array of transducers 992 selected from a group consisting of readers and writers. Portions 972, 980 of inner edges 908, 910 of the tape bearing surface of the each of the outer modules are non-skiving in regions not aligned with the array of transducers in a direction of media travel thereacross, the inner edges facing the inner module. The outer edges 960, 962 may be skiving, as shown in FIG. 9.

In the embodiment of FIG. 9, edges of the tape bearing surface of the inner module are adapted for skiving in regions aligned with the array of transducers in the direction of media travel thereacross. Portions 928 of edges of the tape bearing surface of the inner module are non-skiving in regions not aligned with the array of transducers in the direction of media travel thereacross.

In a variation on the embodiment of FIG. 9, and having common numbering therewith, the outer edges 960, 962 may be beveled. See FIG. 10. Preferably, outer edges 960, 962 of the tape bearing surface of the outer modules are non-skiving relative to an entire width of a tape traveling theracross. Such width can be readily discerned as the width expected to be adjacent the tape in use.

Referring to FIG. 11, in another variation on the embodiment of FIG. 9, and having common numbering therewith, edges of the tape bearing surface of the inner module 904 are adapted for skiving an entire width of a tape traveling theracross.

Referring to FIG. 12, in another variation on the embodiment of FIG. 9, and having common numbering therewith, outer edges 960, 962 of the tape bearing surface of each of the outer modules 902, 906 have a skiving edge 964, 966 extending from a first end of the edge towards a second end thereof, wherein the outer edges of the tape bearing surface of each of the outer modules have a non-skiving portion 968, 970 extending from the second end of the edge to the associated skiving edge.

Benefits of the head configurations described herein include less debris accumulation while simultaneously providing surprisingly lower friction than was expected. Also, the modules may be easier to manufacture as each module may require only readers or writers, and are therefore less susceptible to processing errors. Further, the heads may be simpler to design and assemble, especially where the tape bearing surfaces lie along nearly parallel or parallel planes as in FIG. 3. In addition, the recording gap widths may be reduced.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A magnetic head, comprising:
   outer modules each having a tape bearing surface and an array of transducers selected from a group consisting of readers and writers; and
   an inner module positioned between the outer modules, the inner module having a tape bearing surface and an array of transducers selected from a group consisting of readers and writers,
   wherein portions of edges of the tape bearing surface of the inner module are non-skiving in regions not aligned with the array of transducers in a direction of media travel thereacross,
   wherein an outer edge of the tape bearing surface of each of the outer modules are adapted for skiving air from the magnetic medium when the magnetic medium travels in a direction from the respective outer module towards the inner module.

2. The head as recited in claim 1, wherein edges of the tape bearing surface of the inner module are adapted for skiving in regions aligned with the array of transducers in the direction of media travel thereacross.

3. The head as recited in claim 1, wherein the array of transducers of the inner module includes a plurality of readers, at least one servo reader calibrated to the position of one or more of the readers of the inner module, and no writers; wherein the array of transducers of each of the outer module includes a plurality of writers.

4. The head as recited in claim 1, wherein the inner module has patterning for at least one of inducing the magnetic medium to fly thereover in an area away from the transducers and reducing stiction of the medium to the tape bearing surface of the at least one portion.

5. The head as recited in claim 4, wherein the patterning has physical characteristics of being lapped by tape lapping.

6. The head as recited in claim 1, wherein an entire length of a tape engaging portion of the outer edge of each of the tape bearing surfaces of the outer modules are adapted for skiving.

7. The head as recited in claim 1, wherein portions of the tape bearing surface of the inner module positioned laterally to the array are rough.

8. The head as recited in claim 1, wherein a length of the tape bearing surface of the inner module in the direction of media travel thereacross is less than about 500 microns and greater than 0 microns.

9. A data storage system, comprising:
   a magnetic head as recited in claim 1;
   a drive mechanism for passing a magnetic medium over the magnetic head; and
   a controller electrically coupled to the magnetic head.

10. A magnetic head, comprising:
    outer modules each having a tape bearing surface and an array of transducers selected from a group consisting of readers and writers; and
    an inner module positioned between the outer modules, the inner module having a tape bearing surface and an array of transducers selected from a group consisting of readers and writers,
    wherein portions of the tape bearing surface of the inner module positioned laterally to the array of transducers are rough,
    wherein an outer edge of the tape bearing surface of each of the outer modules is adapted for skiving air from the magnetic medium when the magnetic medium travels in a direction from the respective outer module towards the inner module.

11. The head as recited in claim 10, wherein edges of the tape bearing surface of the inner module are adapted for skiving in regions aligned with the array of transducers in a direction of media travel thereacross, wherein edges of the tape bearing surface of the inner module are non-skiving in regions not aligned with the array of transducers in the direction of media travel thereacross.

12. The head as recited in claim 10, wherein an entire length of a tape engaging portion of the outer edge of each of the tape bearing surfaces of the outer modules are adapted for skiving.

13. A data storage system, comprising:
    a magnetic head as recited in claim 10;

a drive mechanism for passing a magnetic medium over the magnetic head; and a controller electrically coupled to the magnetic head.

14. A magnetic head, comprising:

outer modules each having a tape bearing surface and an array of transducers selected from a group consisting of readers and writers;

an inner module positioned between the outer modules, the inner module having a tape bearing surface and an array of transducers selected from a group consisting of readers and writers, wherein portions of inner edges of the tape bearing surface of the each of the outer modules are non-skiving in regions not aligned with the array of transducers in a direction of media travel thereacross, the inner edges facing the inner module.

15. The head as recited in claim 14, wherein edges of the tape bearing surface of the inner module are adapted for skiving in regions aligned with the array of transducers in the direction of media travel thereacross, wherein portions of edges of the tape bearing surface of the inner module are non-skiving in regions not aligned with the array of transducers in the direction of media travel thereacross.

16. The head as recited in claim 14, wherein outer edges of the tape bearing surface of the outer modules are non-skiving relative to an entire width of a tape traveling thereacross.

17. The head as recited in claim 14, wherein edges of the tape bearing surface of the inner module are adapted for skiving an entire width of a tape traveling thereacross.

18. The head as recited in claim 14, wherein outer edges of the tape bearing surface of each of the outer modules have a skiving edge extending from a first end of the edge towards a second end thereof, wherein the outer edges of the tape bearing surface of each of the outer modules have anon-skiving edge extending from the second end of the edge to the associated skiving edge.

19. A data storage system, comprising:

a magnetic head as recited in claim 14;

a drive mechanism for passing a magnetic medium over the magnetic head; and a controller electrically coupled to the magnetic head.

* * * * *